(No Model.) 2 Sheets—Sheet 1.
L. C. EVANS.
SEEDER.
No. 520,182. Patented May 22, 1894.
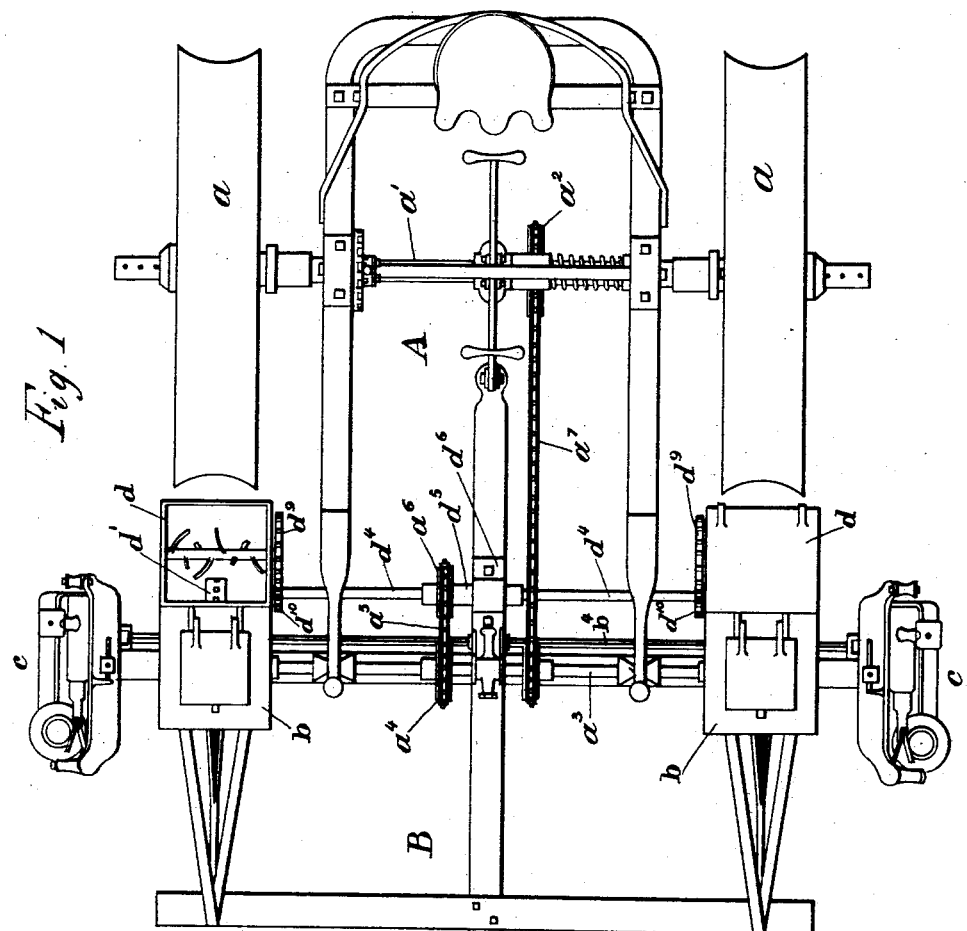
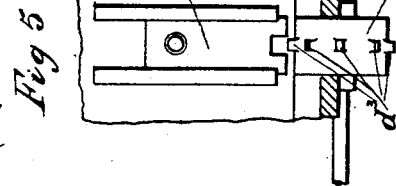
WITNESSES:
INVENTOR
BY
ATTORNEYS (No Model.) 2 Sheets—Sheet 2.
L. C. EVANS.
SEEDER.
No. 520,182. Patented May 22, 1894.
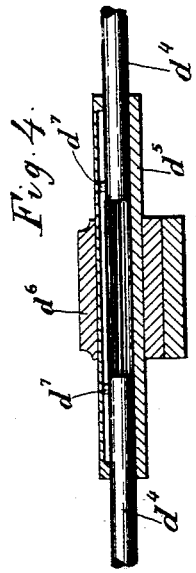
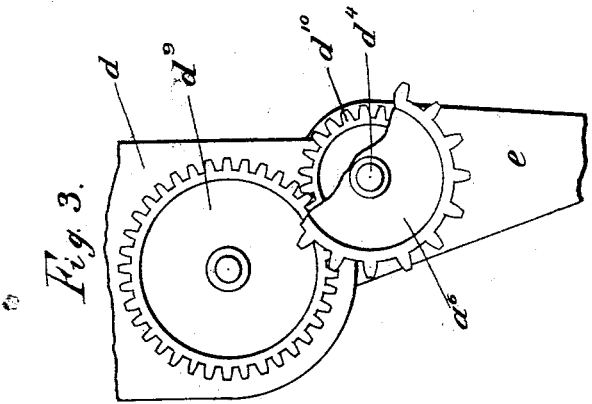
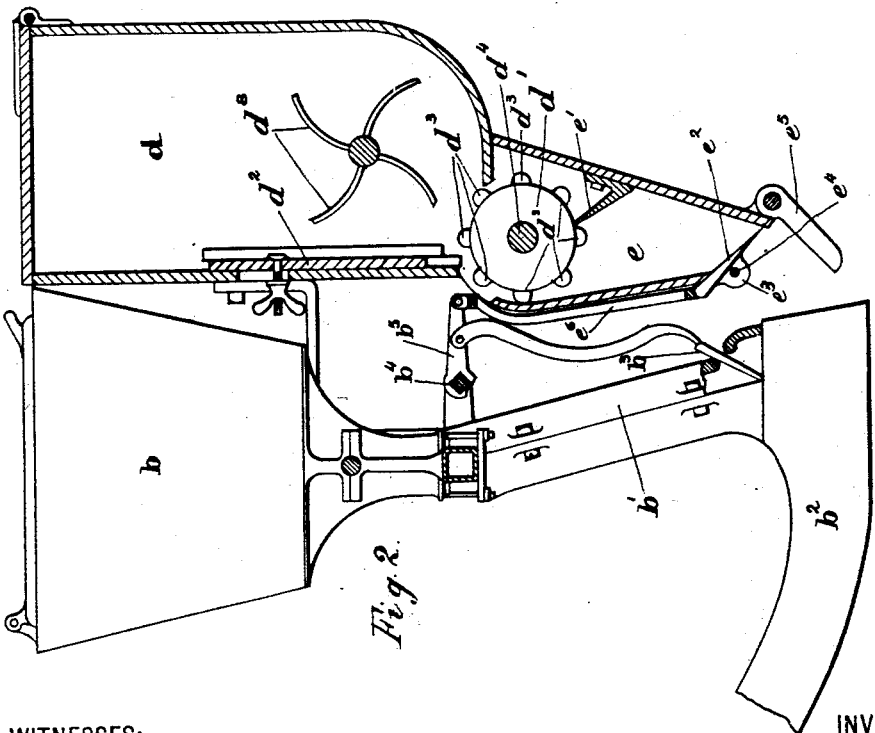
WITNESSES:
INVENTOR
Louis C. Evans
BY
ATTORNEYS

UNITED STATES PATENT OFFICE.

LOUIS C. EVANS, OF SPRINGFIELD, OHIO.

SEEDER.

SPECIFICATION forming part of Letters Patent No. 520,182, dated May 22, 1894.

Application filed November 27, 1893. Serial No. 492,180. (No model.)

*To all whom it may concern:*

Be it known that I, LOUIS C. EVANS, a citizen of the United States, residing at Springfield, in the county of Clark and State of Ohio, have invented certain new and useful Improvements in Seeders, of which the following is a specification.

My invention relates to improvements in seeders, and it especially relates to devices for dropping fertilizer in connection with seed; the invention being especially adapted in its nature for use with combined corn planters; it being adapted also for use with other seeding machines.

My invention consists in the various constructions and combinations of parts hereinafter described and set forth in the claims.

In the accompanying drawings, Figure 1 is a plan view of a machine to which my invention is shown attached. Fig. 2 is a sectional elevation of a portion of the same. Fig. 3 is a side elevation of a portion of the same, and Fig. 4 is a detail showing a portion of the driving mechanism. Fig. 5 is a detail of a fertilizer device.

Like parts are represented by similar letters of reference in the several views.

In the said drawings, A represents a wheel frame and B a runner frame of an ordinary corn planter. The wheel frame is provided with the usual carry wheels $a\, a$, connected to an axle $a'$, having a sprocket wheel $a^2$, which drives a feed shaft $a^3$ on the runner frame through the medium of a chain or other suitable connection $a^7$. The runner frame is provided with seed boxes, $b$, having any suitable and well-known seed devices therein operated from the shaft $a^3$ to discharge the seed from said seed boxes into the seed tubes $b'$ leading to the runners $b^2$. Valves $b^3$ are provided in the seed tubes, adapted to be operated at intervals from check heads $c$, through the medium of an ordinary rock shaft $b^4$; the seeding device in the seed boxes being adapted to drop the corn into the seed tubes, whence it is discharged by the opening of the valves $b^3$ at suitable intervals to form a hill; this being accomplished by an ordinary check wire operated from the check head $c$ in the usual manner; this construction being well-known and constituting what is known as a combined planter.

Located immediately behind each of the seed boxes $b$ is a secondary or auxiliary box $d$, provided at the lower front corner with a distributing wheel $d'$, the wheel being so placed with reference to said box that a small portion of the periphery only projects into said box at the lower front corner; said box being provided with an opening above the wheel adapted to be opened or closed more or less, as desired, by a slide $d^2$. This distributing wheel $d'$ is preferably provided at intervals with small centrally arranged projecting teeth $d^3$. Located below the box $d$ is a conduit or chamber $e$, the upper end of which is preferably made of sufficient size to inclose the distributing wheel $d'$. A scraper $e'$, secured to the side of this chamber, is adapted to rest in close proximity to the periphery of the distributing wheel, said scraper being notched to permit the passage of the teeth $d^3$. The distributing wheels $d'$ are each connected to a revolving shaft $d^4$, the said shafts $d^4$ being joined together at or near their centers to a sleeve $d^5$ so as to form practically one continuous shaft. The sleeve $d^5$ is journaled in a central bearing $d^6$, preferably on the tongue, and is provided with suitable longitudinal grooves or keyways in which projections $d^7$ on the respective shafts are adapted to slide. The result of this construction is to form a practically continuous shaft between the respective distributing wheels, which will at the same time admit of an adjustment of the respective seeding devices to or from each other, the shafts $d^4$ being adapted to slide in the sleeve $d^5$, but being so connected that they always revolve in unison. A sprocket-wheel $a^4$ on the shaft $a^3$ is adapted to impart motion to a chain $a^5$, which passes over the same and over a sprocket wheel $a^6$ on the shaft $d^4$, and thus furnishes a continuous rotary movement of said shaft $d^4$ in unison with the movement of the shaft $a^3$. Located above the distributing wheel $d'$ in each of the boxes $d$, is an agitator $d^8$, provided on the outside of the box with a spur gear $d^9$, adapted to engage a similar gear $d^{10}$ on the shaft $d^4$. The lower end of the chamber $e$ is closed by a valve $e^2$, which is connected to the rock shaft $b^4$, said valve being preferably connected to the same arm $b^5$ to which the valve $b^3$ in the seed tube $b'$ is attached. The lower end of the chamber $e$ is provided with projecting ears or lugs $e^3$, which are connected by a rod $e^4$ below and form a support for the valve $e^2$; said valve being turned inwardly and downwardly so as to stand across the lower end of said chamber at an angle, and adapted, as the arm $b^5$ is oscillated by the rock shaft $b^4$, to move upwardly and outwardly and thus open the lower end of the chamber $e$ and discharge the contents thereof. A hinged spout $e^5$ is preferably provided at the bottom of the chamber $e$ below the valve $e^2$, which spout may be turned to different positions of adjustment to direct the contents of the chamber $e$ when discharged through the valve $e^2$, closer to or farther from the rear end of the runner $b^2$, through which the seed is dropped from the box $b$ the spout being adapted to be held in different positions of adjustment by friction, though other means may be provided, if desired. The auxiliary box $d$ is adapted to contain fertilizer, which, being agitated by the agitator $d^3$, is carried by the periphery of the distributing wheel $d'$ into the chamber $e$, where it is retained by the valve $e^2$ until the seed is discharged from the seed tube $b'$, at which time the fertilizer is, by the simultaneous movement of the respective valves, also discharged in proximity to said seed, the relative points of discharge being adjusted by means of the hinged spout $e^5$.

In order that the fertilizer devices and the seeding devices may be located in close proximity, I construct the stems of the respective valves $b^3$ and $e^2$ with intermeshing parts; that is, the stem of the valve $e^2$ is provided with a slotted opening $e^6$, in which the stem of the valve $b^3$ is adapted to project when the valves are simultaneously opened, thus permitting said valves to move toward each other in opening, and in front of each other in closing.

It will be seen from the above description that I provide a fertilizer distributing device adapted for seeding machines which is extremely simple, and which is capable of discharging fertilizer at the exact point desired to be the most available for the seed. The distributing wheel $d'$ operating as it does at the lower front corner of the fertilizer chamber, with a plain periphery exposed to the fertilizer, operates with a very slight expense of power. The wheel $d'$ is preferably made of glass to resist the corrosive action of the fertilizer and also to prevent the sticking of the same thereon. The teeth $d^3$ may be omitted if desired, as the plain periphery is the essential feeding portion. The teeth, however, are preferably employed to assist to break up the lumps of fertilizer which may accumulate in the opening under the slide $d^2$, the slide being in this case preferably notched to permit the passage of the teeth.

The operation, it is thought, will be clearly understood from the above description. As the machine is advanced the seed and fertilizer are both drilled, as it were, simultaneously into the respective chambers or conduits under the distributing devices, and are retained there by the respective valves so as to simultaneously drop the fertilizer and seed to form a hill. If it is desired to drop the seed in a continuous manner from the boxes, then the respective valves are opened and secured in an open position by any suitable means, in which case the fertilizer and seed are continuously and simultaneously discharged through the respective openings. The valve $e^2$ at the bottom of the fertilizer chamber $e$ being formed at an angle, as described, and supported by the rod underneath, is adapted at each movement to clean itself, the side of the chamber acting as a scraper for this purpose, and thus preventing the fertilizer from accumulating thereon.

Having thus described my invention, I claim—

1. In a seeding machine, a fertilizer hopper, a chamber under said hopper, an opening in the bottom of said hopper leading to said chamber, a distributing wheel located wholly within said chamber so that the periphery thereof shall constitute a portion of the bottom of the fertilizer hopper, means for rotating said distributer so as to carry the fertilizer into said chamber, and a valve at the lower end of said chamber at an angle as described, and means for operating said valve to cause it to produce an angular movement upwardly and outwardly in said chamber, substantially as specified.

2. In a seeding machine having seed boxes and seed tubes, valves in the tubes, and a rock shaft connected to said valves, a fertilizer hopper, a chamber under said hopper, and a continuously-moving distributing wheel located in said chamber so that the periphery thereof forms a portion of the bottom of said hopper, an angularly-arranged valve in said chamber, a connection from said valve to said rock shaft, and means, as described, for intermittently rotating said rock shaft so as to simultaneously operate the said valves, substantially as specified.

3. In a seeding machine, a hopper, a chamber below said hopper, an opening connecting said hopper to said chamber, a distributing wheel located wholly within said chamber with the periphery adapted to stand in said opening so as to constitute a portion of the bottom of said hopper, means, as described, for rotating said distributer to carry the material on its periphery from said hopper into said chamber, and a valve at the bottom of said chamber, substantially as specified.

4. In a seeder, a continuously rotating feed shaft, and a fertilizer shaft connected thereto, fertilizer distributers on said fertilizer shaft, said distributers being adapted to discharge into a chamber under the same, valves in the seed tubes of said seeder and valves in the chambers under said distributing wheels, said valves being each connected to a projecting arm on a rock shaft, and being formed with intermeshing parts, substantially as specified.

5. In a seeder, a fertilizer hopper, an agitator in said hopper, a distributing wheel having teeth adapted to project therein, an adjustable slide above said distributing wheel, a chamber below said distributing wheel and a valve at the bottom of said chamber, a rock shaft connected to said valve, and check-heads connected to said rock shaft, substantially as and for the purpose specified.

6. In a seeder having valves in the seed tubes, and a rock shaft for operating said valves, a fertilizer hopper having distributing wheels adapted to discharge in a chamber under said hopper, a valve at the bottom of said chamber adapted to be operated simultaneously with the valves in the seed tubes, and a swinging spout at the bottom of said chamber, substantially as specified.

7. In a seeder, a distributer consisting essentially of a hopper, a chamber under said hopper, a distributing wheel in said chamber having a plain periphery and centrally arranged teeth to distribute the material from said hopper into said chamber, a valve at the lower end of said chamber at an angle, as described, and a rock shaft having a projecting arm connected to said valve for raising and lowering the same to produce an angular movement thereof upwardly and outwardly in said chamber, substantially as specified.

In testimony whereof I have hereunto set my hand this 18th day of November, A.D. 1893.

LOUIS C. EVANS.

Witnesses:
CHASE STEWART,
CHAS. I. WELCH.